United States Patent
Jantz et al.

(10) Patent No.: US 9,299,037 B2
(45) Date of Patent: Mar. 29, 2016

(54) PROVISION OF ALERT MESSAGES TO CUSTOMERS OF AN ESTABLISHMENT

(75) Inventors: Scott Bergen Jantz, Upland, CA (US); Russel Hempel, West Covina, CA (US)

(73) Assignee: HEARTLAND PAYMENT SYSTEMS, INC., Princeton, NJ (US)

(*) Notice: Subject to any disclaimer, the term of this patent is extended or adjusted under 35 U.S.C. 154(b) by 341 days.

(21) Appl. No.: 13/453,405

(22) Filed: Apr. 23, 2012

(65) Prior Publication Data

US 2012/0296680 A1 Nov. 22, 2012

Related U.S. Application Data

(60) Provisional application No. 61/478,897, filed on Apr. 25, 2011.

(51) Int. Cl.
*G06Q 10/00* (2012.01)
*G06Q 10/02* (2012.01)

(52) U.S. Cl.
CPC .................................... *G06Q 10/02* (2013.01)

(58) Field of Classification Search
CPC ..................................................... G06Q 10/02
See application file for complete search history.

(56) References Cited

U.S. PATENT DOCUMENTS

| | | | | |
|---|---|---|---|---|
| 6,829,583 B1* | 12/2004 | Knapp et al. | ................ | 705/5 |
| 7,822,635 B1* | 10/2010 | Brown | ................ | G06Q 30/02 705/14.1 |
| 7,890,386 B1* | 2/2011 | Reber | ................ | A63F 13/005 705/26.7 |
| 8,041,605 B1* | 10/2011 | Harrity | ................ | 705/15 |
| 8,326,705 B2* | 12/2012 | Niessen et al. | ................ | 705/28 |
| 8,751,427 B1* | 6/2014 | Mysen | ................ | H04L 67/306 705/14.58 |
| 2002/0062236 A1* | 5/2002 | Murashita | ................ | G06Q 10/02 705/5 |
| 2003/0007625 A1* | 1/2003 | Pines | ................ | H04M 3/42008 379/223 |
| 2004/0116115 A1* | 6/2004 | Ertel | ................ | H04W 4/00 455/426.2 |
| 2005/0267787 A1* | 12/2005 | Rose | ................ | G06F 17/30864 705/5 |
| 2008/0214216 A1* | 9/2008 | Bragg | ................ | H04L 67/26 455/466 |
| 2008/0232248 A1* | 9/2008 | Barave | ................ | H04L 12/5855 370/230 |
| 2009/0089149 A1* | 4/2009 | Lerner | ................ | G01C 21/32 705/7.34 |
| 2009/0167553 A1* | 7/2009 | Hong et al. | ................ | 340/825.29 |
| 2010/0015993 A1* | 1/2010 | Dingler | ................ | G06Q 10/109 455/456.1 |
| 2010/0161720 A1* | 6/2010 | Colligan | ................ | G06Q 30/02 709/203 |

* cited by examiner

*Primary Examiner* — Tonya Joseph
(74) *Attorney, Agent, or Firm* — Leffler Intellectual Property Law, PLLC

(57) ABSTRACT

Customer management for an establishment involves operating a server that hosts system software and interacts with various computing devices over internet and wireless network gateway connections. The server communicates with devices at the establishment and customer computing devices in real-time, providing system performance updates, text messaging communications to the customer regarding table availability and marketing information and synchronizing the information communicated within the system. A computer user interface at the establishment communicates with the server and allows an establishment host to capture and transmit customer information to the server and make of the server processing requests that can include sending text message alert notifications to a customer mobile device informing of an available table and providing marketing messages. A secondary device, operated by a waiter of the establishment, communicates with the computing devices of the system and can receive communications, such as customer attention requests, from the customer mobile device.

14 Claims, 6 Drawing Sheets

PROVISION OF ALERT MESSAGES TO CUSTOMERS OF AN ESTABLISHMENT

CROSS REFERENCE TO RELATED APPLICATIONS

This application claims the benefit of U.S. Provisional Application No. 61/478,897, filed Apr. 25, 2011, which is hereby incorporated herein by reference in its entirety.

BACKGROUND

The present invention relates to the provision of alert messages to customers of an establishment.

When visiting a business establishment, such as a restaurant, customers often find that, due to a high volume of earlier-arriving customers, they must wait for the business establishment to be ready to offer them services (e.g., to have a table ready at which they can be seated). Rather than having the customers physically standing in a queue during their wait time, it is common for customers to leave their name at a reception desk. Traditionally, a receptionist would call out the customer's name when the services were ready to be offered. More recently, it is common for the receptionist to hand the customer a short range pager. When the establishment is ready to offer services to the customer, the receptionist identifies which pager was handed to the customer and causes an alert signal to be sent to the short range pager. The short range pager responds to the alert signal by activating one or more user interfaces (e.g., visual, audio, and/or tactile) that are interpreted by the customer as an indication that the services are ready to be provided. The user is then supposed to return the pager to the receptionist who then arranges for the services to be provided to the customer (e.g., someone shows the customer to a table) and also arranges for the pager to be made ready for a next customer.

The inventors of the subject matter described herein have recognized that existing customer notification techniques have a number of drawbacks. For example, short range pagers have limited range. This makes it possible for a waiting customer to wander far enough away from the establishment that the customer's pager does will not respond to an alert signal when it is activated. The customer under such circumstances will fail to receive the notification. In the best of such circumstances, delivery of the customer's services are delayed only by the amount of time it takes for the customer to come back within radio range of the establishment and receive the notification. In worse circumstances, the establishment waits only so long before moving on to give the services to a next waiting customer, so that even when the original customer does return to the receptionist, s/he must now wait further for the establishment to again be ready to offer the services.

Other examples of drawbacks of existing notification techniques come from the fact that short range pagers have poor battery life, and are very often stolen.

The inventors of the subject matter described herein have therefore recognized that it is desirable to have other means for providing alert messages to customers of an establishment.

SUMMARY

In accordance with one aspect of the invention, the objects of the invention are achieved in a customer management system and method that perform electronic messaging of customers of an establishment regarding front of house operations, including table availability, and marketing messages. This involves operating a server that hosts system software and is in communication with various other computing devices, via an internet web browser and a wireless network gateway, which establish the operating environment for the system including synchronizing the information communicated within the system. A user interface, hosted upon a computer at a business establishment, provides a host user with multiple processing request options and selection capabilities that can be transmitted to the server for execution and updating of the user interface. The user interface displays configuration information for the establishment. For example, and without limitation, in embodiments in which the business establishment is a restaurant or equivalent, the displayed configuration information includes, without limitation, table layout and seating chart information that can be used to provide reservation information to the user. Through the user interface the host/hostess user can communicate in real-time, via text messaging capabilities provided by the server, with the customer regarding table availability and marketing information. A wireless message gateway enables a customer mobile device to be in communication with the server and thereby enables the customer to receive text message alert notifications (e.g., originating from the business establishment's computer) regarding table availability and marketing messages from the establishment. A secondary device, operated by, for example, a waiter of the establishment, is also in communication with the computer and server and can provide and receive real-time communications from the customer mobile device. The customer is thereby enabled to make attention requests directly to the waiter in accordance with the customer's needs.

BRIEF DESCRIPTION OF THE DRAWINGS

The objects and advantages of the invention will be understood by reading the following detailed description in conjunction with the drawings in which.

DETAILED DESCRIPTION

Figure 1:
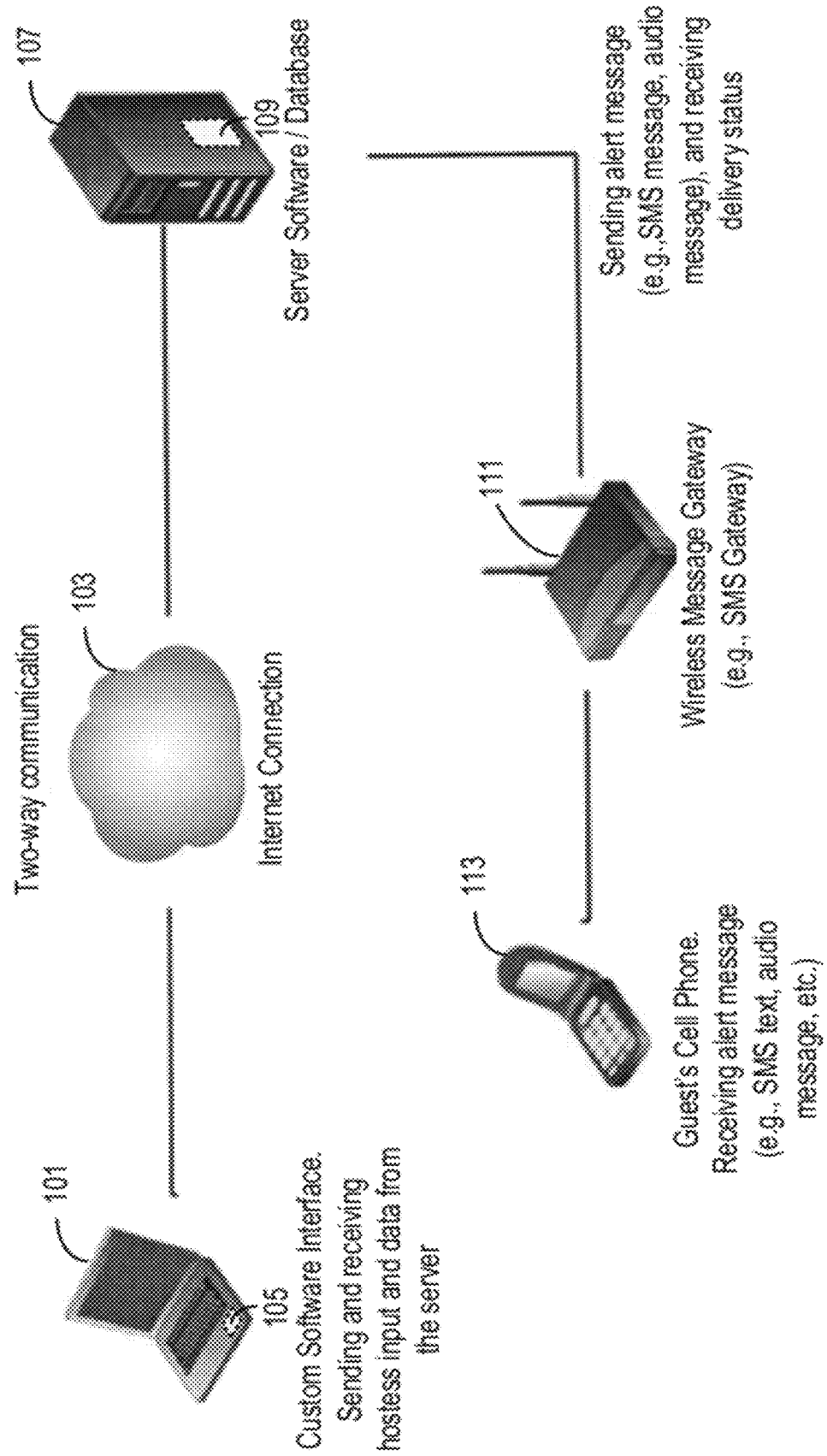
FIG. 1 is a schematic/block diagram of an exemplary embodiment of a system incorporating aspects of the invention.

The various features of the invention will now be described with reference to the figures, in which like parts are identified with the same reference characters.

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Aspects of some embodiments consistent with the invention are characterized by an internet browser based system configured to manage a business establishment's wait queue, and to send one or more alert messages to a customer's own cell phone (e.g., by means of text messages or pre-recorded audio messages) when services are ready to be offered. These and other aspects are described in further detail in the following.

FIG. 1 is a schematic/block diagram of an exemplary embodiment of a system incorporating aspects of the invention. A computer 101 (e.g., comprising one or more programmable processors coupled to storage means for storing program instructions, and to one or more user input/output devices) includes web browser software capable of accessing a server 107 via the Internet 103. Web browser software is well known in the art, and need not be described here in further detail.

Via any internet connected web browser, a person at the business establishment (e.g., a manager or hostess) logs in to the server 107 with a secure username and password. A successful login causes the server 107 to respond by supplying the computer 101 with interface software 105 (e.g., stored on a fixed or removable non-transitory computer-readable storage medium) that, when run by one or more of the computer 101's processors, causes the computer 101 to provide a user interface that enables the following functionality (the interface software 105 is preferably presented to the user by means of the web browser software):

The computer's user interface software 105 presents the person with an interface that allows for guests to be added to a dynamic queue collecting information about the guests, including their cell phone's telephone number. If the user chooses not to divulge the cell phone telephone number, this can be accommodated by giving the user a traditional pager or even by having the user wait at the location.

After the above-described information is captured and added to the queue, a visual representation is shown on the computer 101, including how long they have waited, the guest's party size, and other relevant information in relation to other guests.

Once a table or service is ready for a particular guest, the name representing that guest can be selected by the person at the business establishment (e.g., by hovering over the guest's name in the display and clicking on it, or in the case of a touch screen, touching the guest's name on the display). In response to this selection, a context menu is displayed. The context menu presents options relevant to the particular business. One option is a command to send an alert message (e.g., an SMS text message, a pre-recorded audio message, or the like) to the guest's cell phone. As will be explained in further detail below, this results in the user's cell phone receiving the alert message, which serves as a notification to the user that the service they desire is ready to be offered. (There may be other reasons why a business establishment would want a guest to return to a reception point, and the alert message may be used for this purpose too.)

In response to the alert message, the guest returns to the reception point. Upon arrival, they check in with the person at the business establishment in person. The person at the business establishment then takes appropriate action(s) to initiate providing the service. For example, in the case of a restaurant, a hostess or manager can choose to seat them at a table. To facilitate selection of a table, the hostess or manager can use the computer 101 to display a business establishment-configured seating chart showing available tables. Once seated (or the service is otherwise initiated), the guest's name is removed from the queue.

In another aspect of some but not necessarily all embodiments consistent with the invention, reservations or appointments can also be added via the software interface or via a separate website that can be made available to the general public.

Working in conjunction with the above computer 101 and interface software 105 is the server 107, which, as mentioned above, also has access to the Internet 103. In some embodiments, there may be more than one server, but to facilitate the reader's understanding of the various aspects of embodiments consistent with the invention, only a single server 107 is shown in this embodiment. The server 107 (e.g., comprising one or more programmable processors coupled to storage means for storing program instructions, and to one or more user input/output devices) includes server software 109 (e.g., stored on a fixed or removable non-transitory computer-readable storage medium) that, when run by one or more of the servers 107's processors, causes the server(s) 107 to provide the following functionality: The server(s) 107 receive all traffic from each business establishment location using a software interface provided by the server software 109. Each action on the software interface is recorded in a database (in this sense, the server software 109 can be considered to be partitioned into "middleware" that supplies and then interacts with the user interface software 105, and also a database), and the server 107 collects and processes requests, data, and the like. In some instances, the results of such processing are communicated back to the computer 101 via the Internet connection 103. If an alert message (e.g., SMS text message, pre-recorded audio message, or equivalent) is to be sent to a particular guest, the server 107 connects with an outside service provider 111 (e.g., SMS gateway) and supplies the outside service provider 111 with the alert message to be sent, the guest's telephone number, and in some but not necessarily all embodiments other information (e.g., whether it is an audio message or a text message being sent) that fully instructs the outside service provider 111 with sufficient information to send the alert message to the guest's cell phone 113 via wireless means.

Considering the above-described system as a whole, there are two main pieces of software: one that runs the interface that, via the computer 101, interacts with a person associated with the business establishment, and another piece of software that runs on the server(s) 107. Both send information back and forth to achieve the function described previously. More particularly, the computer 101 runs the software interface 105 (e.g., as a web page within a web browser), which accepts all input from a person associated with the business establishment (e.g., manager or hostess). When actions (e.g., "send alert message to guest") are invoked (e.g., by someone typing, clicking, using a touch screen of the computer 101), the server(s) 107 respond accordingly. Alert messages sent from the software interface 105 to the server(s) 107 are then sent by the server(s) 107 to the outside service provider 111, which then causes the alert message to be delivered to the guest's cell phone 113 via wireless means.

To set up a system, a person or persons associated with the business establishment would set up an Internet connected computer, open up a web browser, and type in the URL for the main system application located in the server 107. The person enters their issued username and password. If these are valid, the computer 101 presents him/her with a main system interface generated by the server software 109 associated with the server 107. Guests can be added, messaged, managed, removed, and the like. Reservations can be set up, table charts created, guests seated, and more.

In some but not necessarily all embodiments, other actions include one or more of: adding guests to a queue; editing a guest's already-entered information; changing a guest's status; making reservations; defining table layouts. This list of actions is exemplary, and not limiting; the system can further be configured to perform other actions, as appropriate and useful to the particular type of business.

In another aspect of some but not necessarily all embodiments, Additional software components run in conjunction with, or otherwise use the results of, the components described above. For example, other applications can be incorporated that are configured to use the data collected by the server to produce reports, quick views of activity at a location, sending bulk marketing text messages, and the like. This list is not intended to be exhaustive of all possibilities, but merely exemplary.

Figure 2:
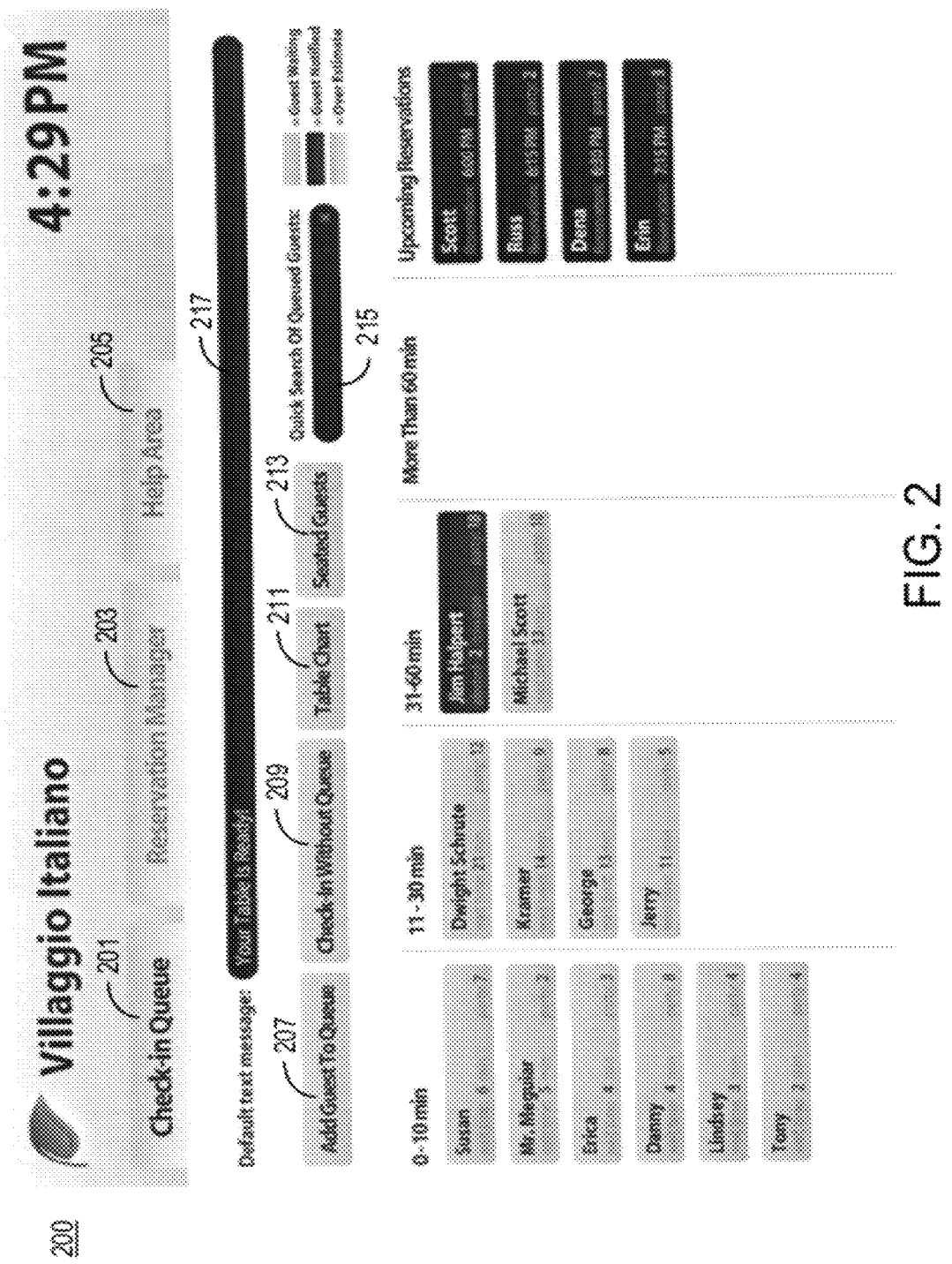
FIG. 2 illustrates an exemplary main interface that can be generated and presented on a computer in accordance with an aspect of embodiments consistent with the invention.

FIG. 2 illustrates an exemplary main interface 200 that can be generated and presented on the computer 101. The main interface 200 has user-selectable tabs that enable ready access to check-in queue functions 201, reservation functions 203, and software help functions 205. In the exemplary screen shot depicted in FIG. 2, the check-in queue functions 201 have been selected. Within this set of functions are user-selectable tabs that enable ready access to related functions such as, but not limited to: an add guest to queue function 207; a check-in without queue function 209; a table chart 211; and a list of seated guests 213. The check-in queue functions 201 also include a guest search data entry window 215 and an alert message data entry window 217. It can further be seen that, in this example, people associated with the business establishment are given ready access to system-generated information, such as how long each guest has been waiting for services, how many people are associated with the guest name, upcoming reservation information, and the like. In another aspect of some but not necessarily all embodiments, other information about the guests, such as seating preference, can also be displayed. To facilitate comprehension of the data being presented, guest information in this example is organized in columns, each column representing a particular length of time that guests appearing in that column have been waiting. Systems in accordance with some inventive embodiments can automatically move guest names from one column to another as their wait time values change.

Figure 3:
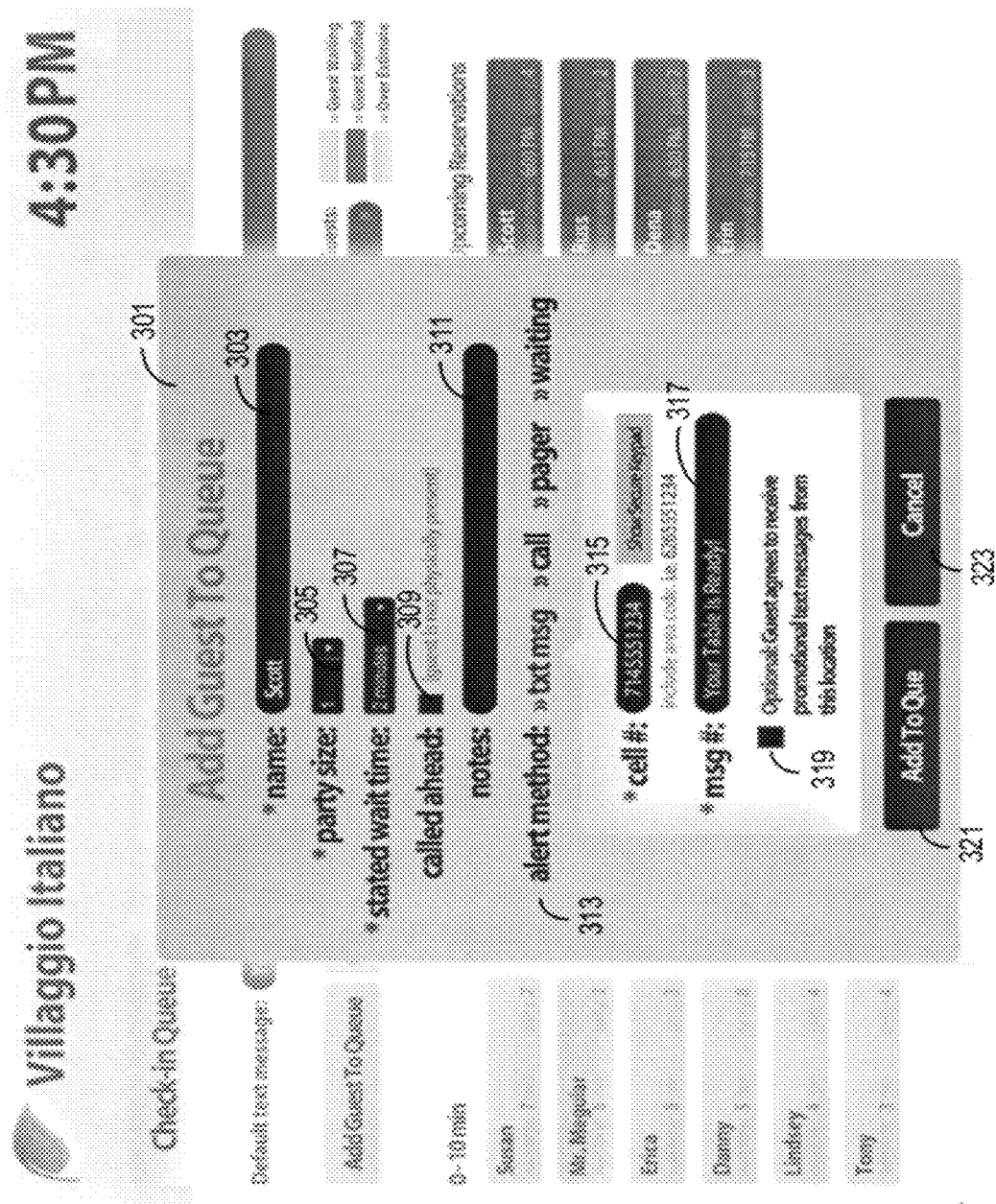
FIG. 3 illustrates an exemplary "add guest to queue" interface that can be generated and presented on a computer in accordance with an aspect of embodiments consistent with the invention.

FIG. 3 illustrates an exemplary "add guest to queue" interface 301 that can be generated and presented on the computer 101. The "add guest to queue" interface 301 in this example includes data entry fields for a guest's name 303; party size 305; stated wait time 307 (useful for knowing what the guest's expectations are); a "call ahead" field 309 (indicates that the guest is not physically present); and a general notes field 311.

The exemplary "add guest to queue" interface 301 further includes "alert method" fields 313 that include selectable fields for entering the guest contact method and applicable information. In the illustration of FIG. 3, the text message ("txt msg") option has been selected, which opens up a window containing data entry fields for a cell phone telephone number 315 and a text message to be sent 315. In some but not necessarily all embodiments, other information can be entered as well, such as a check box 319 indicating whether the guest agrees to receive promotional text messages from the business establishment.

When all of the data has been entered, a person associated with the business establishment selects an "add to queue" button 321, which causes the entered information to be entered into the system and the guest added to the system's wait queue. If it is desired to cancel out of this window, the person associated with the business establishment can alternatively select a "cancel" button 323, which cause any entered data to be erased and a return to the main interface 200.

Figure 4:
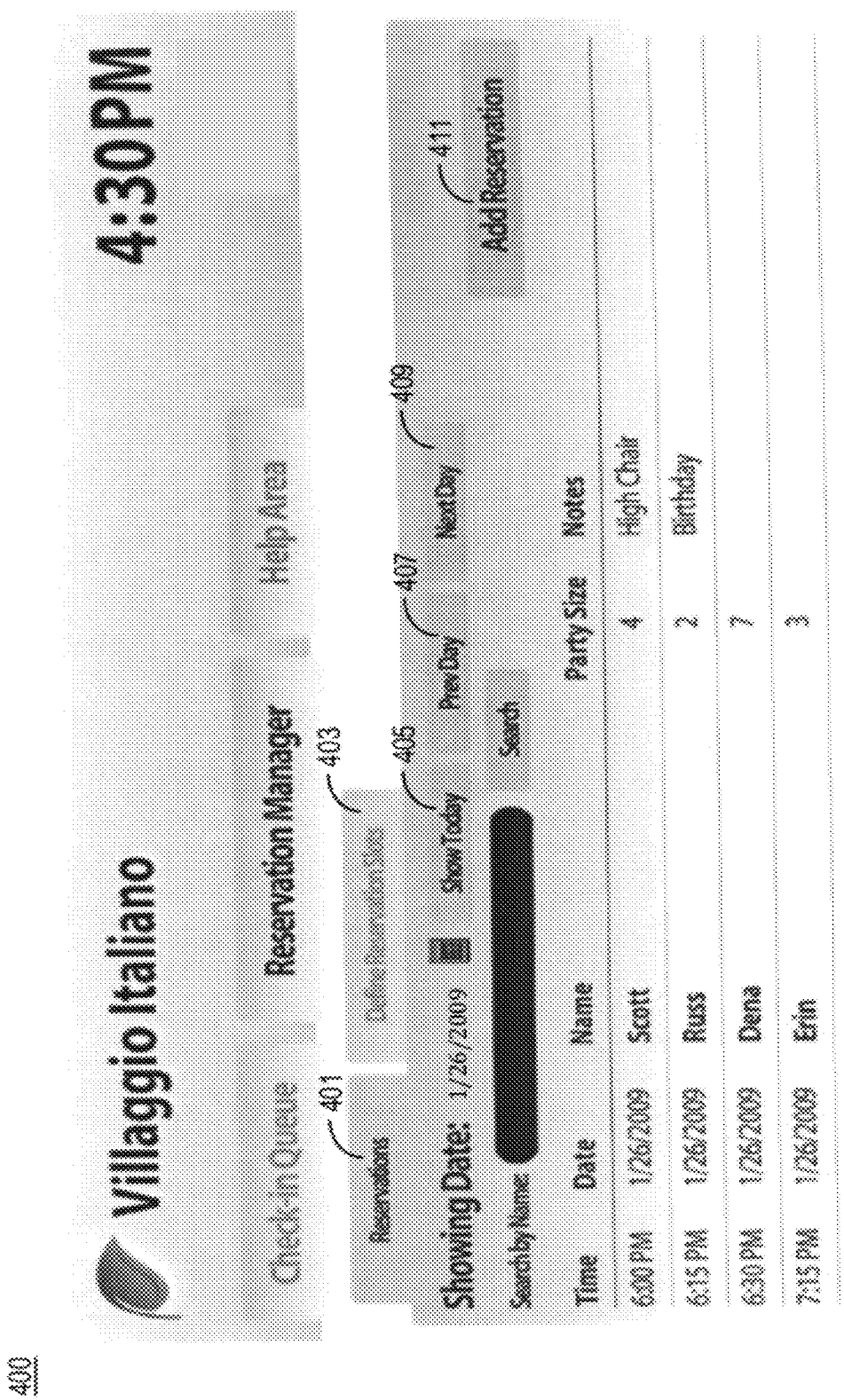
FIG. 4 illustrates an exemplary reservation manager interface that can be generated and presented on a computer in accordance with an aspect of embodiments consistent with the invention.

FIG. 4 illustrates an exemplary reservation manager interface 401 that can be generated and presented on the computer 101. The reservation manager interface 401 in this example includes user-selectable tabs: one for reservations 401, and another for "define reservation slots" 403. In this example, the reservations tab 401 has been selected, revealing selectable tabs that permit a user to select the date for which reservations are to be viewed (in this example, the tabs permit selection of "show today" 405, "previous day" 407, and "next day" 409, letting it be seen that exemplary reservations exists in each of four time slots: 6:00 PM, 6:15 PM, 6:30 PM, and 7:15 PM.) The display can also be configured to display other relevant information such as, but not limited to, the "date", the guest's name, the party size, and any extra notes relating to the particular reservation (e.g., whether the guests need a high chair, or whether they are celebrating a birthday).

The reservation manager interface 401 also includes an "add reservation" button 411 that, when selected by the user of the computer 101, causes a data entry screen to open up with fields that permit another reservation to be added to the pre-existing ones.

It can be seen that, in this example, reservation slots are spaced 15 minutes apart, starting on the hour. This is user-configurable, with appropriate slot configuration control fields being made available when the user selects the "define reservation slots" tab 403.

Figure 5:
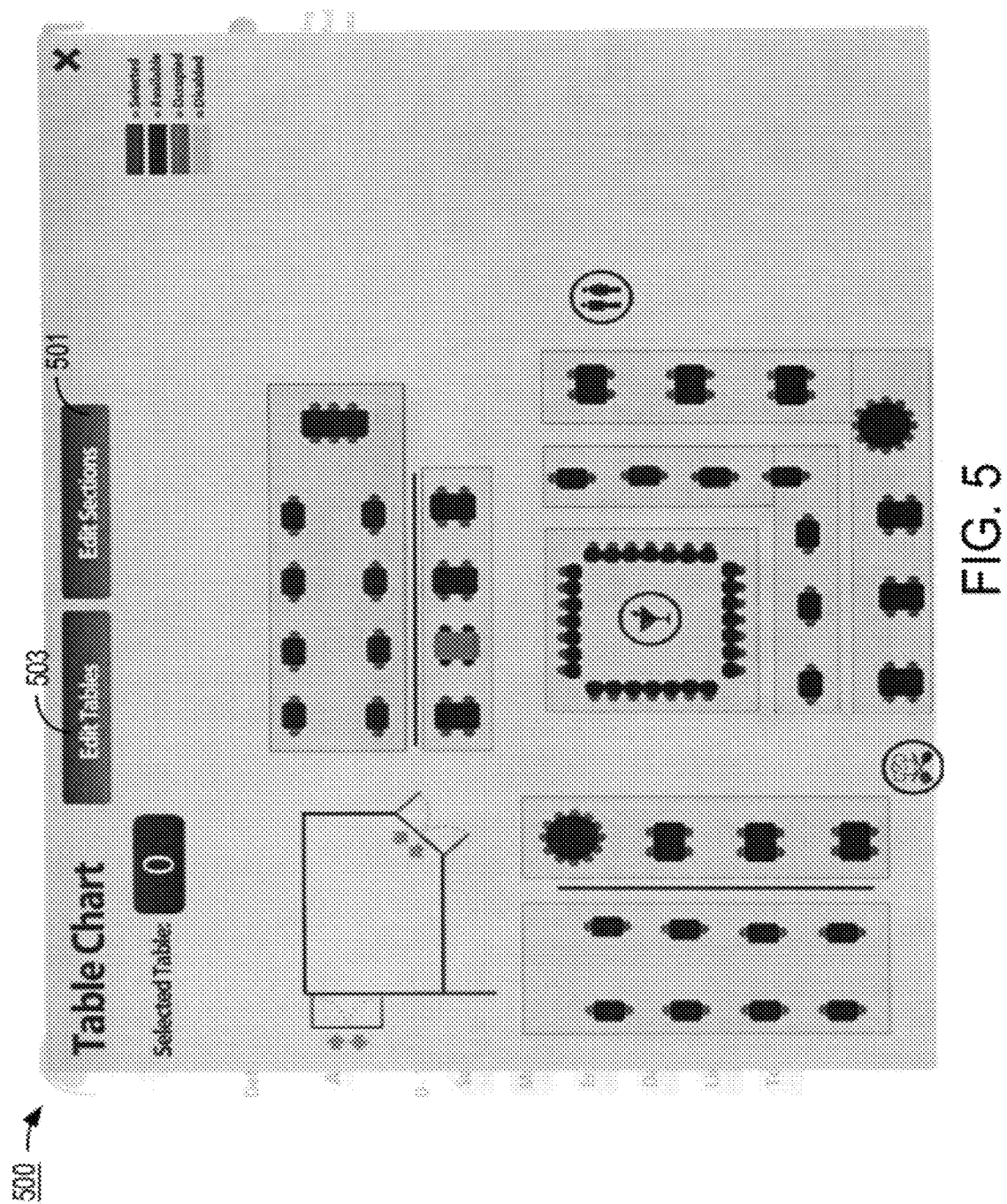
FIG. 5 illustrates an exemplary table chart that is displayed when the table chart tab is selected, in accordance with an aspect of embodiments consistent with the invention.

FIG. 5 illustrates an exemplary table chart 500 that is displayed when the table chart tab 211 is selected. As illustrated, a "bird's-eye" view of the restaurant is depicted, with tables preferably shown as they are actually arranged in the restaurant. Color coding and/or shading can be used to indicate whether particular tables and/or seats are either available, or occupied. Color coding and/or shading can also indicate whether a particular table or seat is selected (i.e., to enable its status to be changed by the computer user) and/or whether a particular table or seat will accommodate a disabled. If one or more tables/seats are "selected", their status can be changed by clicking on an "edit selections" button which causes a suitable data entry window to open up. The table configuration itself can be modified by clicking on an "edit tables" button 503, which causes a restaurant layout editor to be invoked.

In another aspect of some but not necessarily all embodiments consistent with the invention, one or more of the above-described components are configured to send a text message to a guest letting him/her know what time they were added to the wait list. The same or a different message can also let them know what time they can expect to be alerted based on their stated wait time.

In another aspect of some but not necessarily all embodiments consistent with the invention, one or more of the above-described components are configured to offer a dual screen mode of operation, whereby a user sets up a second monitor. The software is configured to display the wait list queue on one of the monitors while concurrently displaying a different menu screen, such as a seating chart, on the second monitor.

In another aspect of some but not necessarily all embodiments consistent with the invention, one or more of the above-described components are configured to enable online reservations to be made by customers without leaving the restaurant website.

In another aspect of some but not necessarily all embodiments consistent with the invention, one or more of the above-described components are configured to add guests to the wait queue with the information being supplied by a secondary device.

In another aspect of some but not necessarily all embodiments consistent with the invention, one or more of the above-described components are configured to clear tables (i.e., change the status of one or more tables from "occupied" to "available"), with the information for making the status changing being supplied by a secondary device. Such status changes can be considered "dynamic" in that the status can be expected to change states any number of times during the business establishment's normal course of operation. Updating a dynamic state can result in a corresponding change in pictorial display presented to a user (e.g., a table color can change, with color being coded to indicate either "occupied" or "available"). Any other connected secondary devices can also be updated to reflect the most-recent status information.

Figure 6:
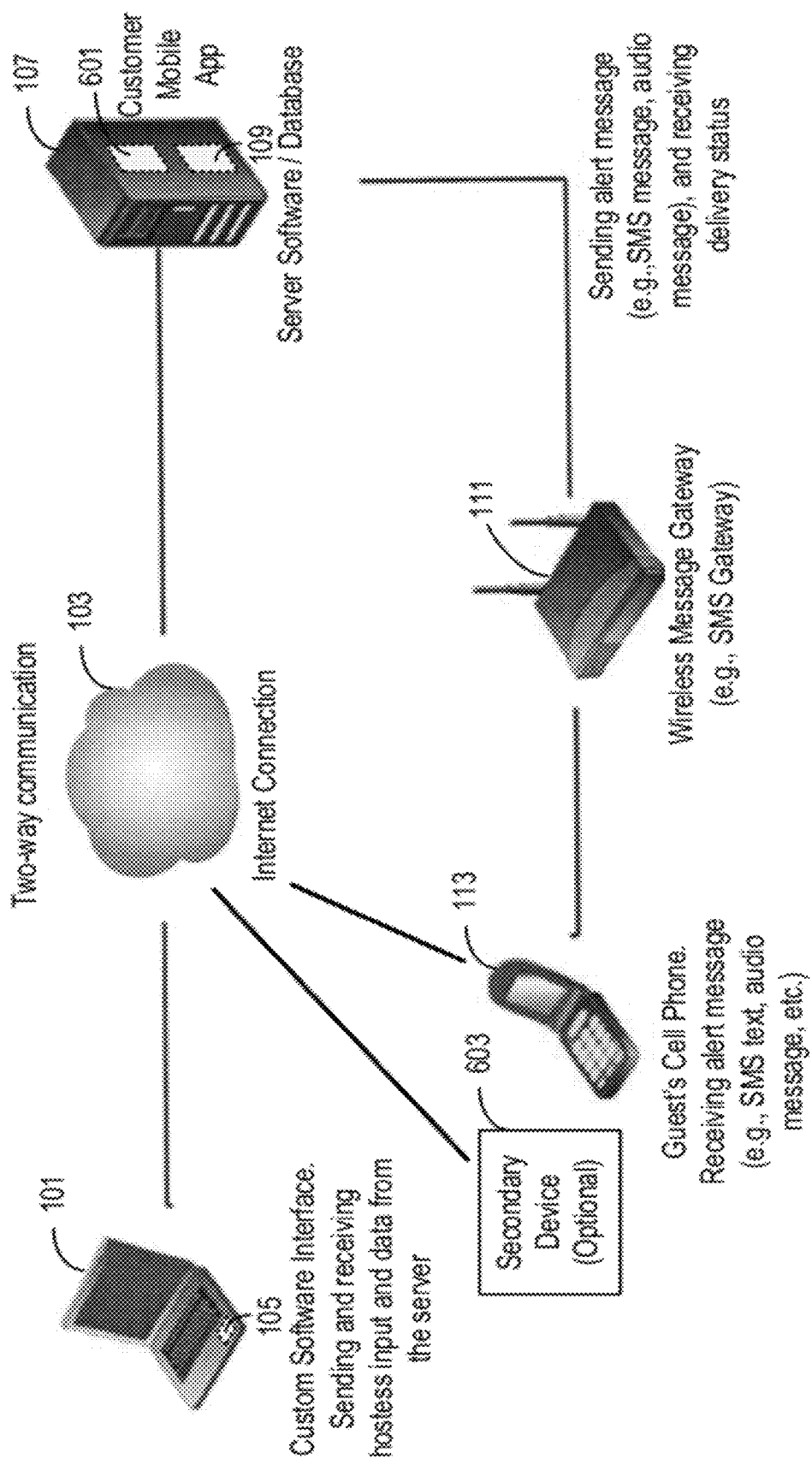
FIG. 6 is a schematic/block diagram of an exemplary alternative embodiment of a system incorporating aspects of the invention.

In another aspect of some but not necessarily all embodiments, any action on any connected device can synchronize/update/trigger any data or event on all other connected devices. Every single action in the application can be triggered/synchronized remotely by another connected device or by the central remote server 107. Events include, but are not limited to:

remote pager activation
    test message alerting
    adding/editing any guest status or information
    guest registration
    guest check-in
    queue management/changes
    adding/editing reservation slots
    adding/editing reservations
    editing a table chart
    filling/editing/marking as dirty/clearing tables
    adding/editing server templates
    adding/editing customer dining records
    editing seating preference list(s)
    editing notes list(s)
    sending seated guests back to the queue In another aspect of some but not necessarily all embodiments consistent with the invention, one or more of the above-described components are configured to change the status of one or more tables from such states as "cleared", "dirty", "occupied", "available', and the like. The information for making the status change can be supplied by any of a number of sources such as, but not limited to, a hostess station, a secondary device, or a customer's device (e.g., the customer's cell phone 113). FIG. 6 illustrates an exemplary arrangement whereby the customer's cell phone 113 is able to access, via an internet connection 103, a customer mobile application 601 that resides on the server 107. In some but not necessarily all embodiments, a secondary device 603 is additionally or alternatively provided that can access one or more of the software components on the server 107.

Such an arrangement further enables features such as "waiter paging" whereby, from the main interface (e.g., provided by the software 109), a secondary application (e.g., the customer mobile application 601), or a separate application (not shown), a waiter can be contacted via their own cell phone or other secondary mobile device, wherein the contact informs the waiter that a table is in need of the waiter's attention. For example, the guests at the table may be in a hurry and need to pay their bill right away. Other relevant actions/needs can also be communicated to waiters via this process. The waiter can then respond quickly as requested.

In another aspect of some but not necessarily all embodiments consistent with the invention, on or more of the above-described components are configured to activate conventional pager systems from within the web-based software application. This is accomplished by running a secondary bridge application (not shown) that connects to the paging base stations via serial connection, Ethernet, or any other means to activate pagers that resides on at least one computer at the location connected to the paging base station. This secondary bridge application can be implemented in any number of ways so as to be compatible with known brands of paging hardware (e.g., LRS, HME, Jtech systems) without the main part of the application needing any configuration at all. This has the advantage of making the system efficient (in terms of cost and time) to set up at various locations. The secondary bridge application enables additional paging system types to be added at any time without the need to change any code in the main application. This also means that custom paging systems can be integrated for use with only a single customer, if needed. This technology can also be applied to any other hardware device, such as payment systems, cash drawers, printers, interactive screens at each table, just to name a few non-limiting examples. Additional separate applications can be made in a similar fashion to access the main server and read and write data changes without requiring that the main application code be altered in any way.

The secondary bridge application can sit on any computer associated with the location premises and does not need to reside on the same device as the main application. In case of a legacy serial connection, the computer must be physically connected to the paging system. If the paging system has an Ethernet interface, the secondary bridge application does not even need to be directly connected to the paging system, but only needs to be on the same network.

The provision of a secondary bridge application provides an additional benefit in that, if a device that runs the main application (or any other secondary application also) is unable to connect to the paging system directly (e.g., due to lack of serial or USB port, or for some other reason), then the secondary bridge application makes it possible for those devices to still activate pagers directly from their interfaces.

In yet another aspect of some but not necessarily all embodiments, execution of the paging application triggers the other connected devices (handheld and otherwise) to update their status to reflect the fact that the guest has been paged. This is similar to the other secondary applications triggering an event that is sent to all other connected devices and computer.

In another aspect of some but not necessarily all embodiments consistent with the invention, one or more of the above-described components are configured to run multiple instances of the software application that stay synchronized via the Internet. Any action carried out on a single instance is carried out on all instances logged into the same account. Synchronization is very important to operating a large location because it is desirable to run any number of machines, distributed throughout the location. The various machines should all stay synchronized with one another for proper operation. For example, suppose an establishment has two entrances (denoted "1" and "2") on different floors of a building. If the hostess at door 1 seats a party, all hostesses must know about this (i.e., including a hostess at door 2) in order to avoid the possibility of the same table being assigned to other guests arriving at door 2. This is true for many events that the multiple hostesses may need to know at any given moment, such as but not limited to things like queue status, special notes, wait times, table layouts, reservation additions, cancelations, server (e.g., waiter) rotation updates, and special requests. Synchronization updates should be carried out in near real time (e.g., within about 2 seconds). In some embodiments, change events are recorded on the server 107 from the application instances making the change. That event log is scanned by the server 107 at a given polling rate (e.g., anywhere between 0.5 seconds and 20 seconds, with 2 seconds being considered a reasonable rate) prior. If there is a change, data is passed appropriately to each connected device and that new information is displayed accordingly on the device. If two conflicting actions are placed on two or more separate devices within the same polling rate interval, a screen is shown on the second (or more) device(s) inquiring which update should be considered to be the real (final) one. The occurrence of conflicting updates within the same polling interval is likely to be a rare event.

In another aspect of some but not necessarily all embodiments consistent with the invention, one or more of the above-described components are configured to confirm reservations by means of SMS text message (or equivalent). If a customer makes a reservation with a location online or otherwise, a text message can be sent to the customer's cell phone and the customer replies to that message to confirm the reservation. In alternative embodiments (or in addition), customers can be provided other mechanisms for confirming a reservation such as, but not limited to, using a voice mail/email system. In exemplary embodiments, a reservation is not activated as a "live" reservation until the confirmation process is completed by the customer. For example, the customer can use his/her cell phone (although any number of alternative methods can be used) to text in a confirmation text message. This is sent to the system's text provider, which relays that message to the server 107. The server then marks the appropriate reservation as "live" and then that update is synchronized to all of the connected devices. This preferably takes place within seconds (e.g., within about 3 seconds) after the text message from the customer has been received.

The customer's confirmation message can be routed through any number of intermediate mechanisms, but ultimately needs to arrive at the server 107 so that the reservation can be stored and provided to the interface 105.

The system is able to distinguish between an instance being accessed in-house (e.g., by one of the employees) and one being accessed online by a customer. Customer facing applications use different system methods from those used by all of the employee/manager applications. All information generated by customer facing applications (e.g., online web reservations, having a customer put him/herself on a Wait Queue) create new records. New records must be created before they can be edited by the staff. For this reason, no editing collision between customer and business establishment personnel can take place.

In another aspect of some but not necessarily all embodiments consistent with the invention, the customers can interact with the various applications of the customer management system of the current invention through multiple platforms. These platforms include, without limitation, the Apple™ iOS and Android™ OS environments which enable interaction through mobile and tablet devices as a native application.

In another aspect of some but not necessarily all embodiments consistent with the invention, the customer management system provides an application program interface that enables a user to transmit and receive text messages for various purposes. For example, a text message marketing system may be enabled that is capable of functioning independently and in association with the other functional capabilities of the customer management system of the current invention. Thus, the customer device(s), such as the customer mobile phone that is in communication with the server, may be able to receive marketing text messages in addition to the alert notifications regarding table availability at the establishment that they are capable of receiving from the server. Due to the application program interface, various capabilities, such as the text message marketing system are capable of implementation as a separate, stand-alone system that integrates with the functional capabilities of the current invention. The text message marketing system may provide the customer general marketing information and specific marketing information regarding a particular establishment. The text message marketing system may also provide the customer with coupons, electronic coupons, customer rewards and loyalty program features. It is contemplated that the text message marketing system may communicate various types of information or provide various capabilities to the customer in receipt of the communication.

The invention has been described with reference to particular embodiments. However, it will be readily apparent to those skilled in the art that it is possible to embody the invention in specific forms other than those of the embodiment described above.

For example, consistent with the exemplary restaurant scenario utilized above, terms such as "guests", "manager", and "hostess" have been used. However, embodiments consistent with the invention can be utilized in many other contexts (e.g., doctors' offices; bowling alleys; . . . any establishment in which the establishment may not have the resources readily available to serve a consumer when the consumer arrives to receive those services, so that the consumer has to wait in some form of queue for a service, activity, or function).

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A customer management system for a business establishment, comprising:

a server for hosting software and interfaces that establish and allow the execution of operations for the business establishment, wherein the server is communicatively enabled over an internet web browser and wireless message gateway to communicate with a customer of the business establishment via text messaging that provides alert notification regarding table availability at the business establishment and marketing messages, and wherein the server maintains real-time synchronization of data processed by and information communicated throughout the customer management system;

a user interface presented to a first user by a computer at the business establishment in communication with the server, wherein the user interface displays multiple processing request options and establishment configuration information to the first user, wherein the user interface allows inputs by the first user to capture information including information indicating that the customer is physically present at the business establishment and make processing request selections that can be transmitted to the server, wherein the information display provided by the user interface is updated and synchronized in real-time by the server;

a wireless message gateway for enabling a customer mobile device to be in communication with the server and thereby enabling the customer to receive text message alert notifications and allowing the customer to communicate with devices communicatively coupled by the customer management system; and a secondary device in communication with the server allowing a second user to enter and transmit information throughout the system, wherein, when the captured information includes information indicating that the customer is physically present at the business establishment, the secondary device provides to the second user a display of information that is updated and synchronized in real-time by the server, wherein the secondary device can receive customer service attention requests from the customer via the customer mobile device.

2. The system of claim 1, wherein the customer mobile device is enabled via an internet web browser to communicate with the server.

3. The system of claim 1, wherein the secondary device receives the customer service attention request after the customer has received the text message alert notification regarding table availability.

4. The system of claim 1, wherein the secondary device is a mobile device possessed at the business establishment by the second user.

5. The system of claim 1, wherein the secondary device is configured to update a status change into the system.

6. The system of claim 1, wherein the secondary device is configured to add a customer to a wait queue of the customer management system.

7. The system of claim 1, wherein the user interface is configured to present information representing the customer to the first user when the service request is ready to be offered by the business establishment, and to accept an input representing a selection of the customer by the first user.

8. An apparatus for communicating with a customer of a business establishment, the apparatus comprising:

a processor;
a memory;

a hosted Internet browser based customer management system for the business establishment, including software and interfaces hosted and executable by the processor and memory, wherein the apparatus is configured to communicate to the customer, via text messaging enabled by a wireless message gateway, an alert notification regarding table availability at the business establishment and marketing messages, wherein the apparatus maintains real-time synchronization of data processed by and information communicated throughout the customer management system, and wherein the apparatus is in communication with:

a computer at the business establishment that presents a user interface to a first user, wherein the user interface displays multiple processing request options and establishment configuration information to the first user, wherein the user interface allows inputs by the first user to capture information including information indicating that the customer is physically present at the business establishment and make processing request selections that can be transmitted to the apparatus, wherein the information display provided by the user interface is updated and synchronized in real-time by the apparatus;

a wireless message gateway that operates to provide text message alert notifications from the apparatus to a customer mobile device when the captured information includes information indicating that the customer is physically present at the business establishment, and that operates to provide the apparatus with communications received from the customer mobile device, wherein the apparatus is configured to supply the communications received from the customer mobile device to devices communicatively coupled by the apparatus; and a secondary device at the business establishment allowing a second user to enter and transmit information throughout the system, wherein, when the captured information includes information indicating that the customer is physically present at the business establishment, the secondary device provides to the second user a display of information that is updated and synchronized in real-time by the apparatus, wherein the secondary device can receive customer service attention requests from the customer via the customer mobile device.

9. The apparatus of claim 8, wherein the customer mobile device is enabled via an internet web browser to communicate with the server.

10. The apparatus of claim 8, wherein the secondary device receives the customer service attention request after the customer has received the text message alert notification regarding table availability.

11. The apparatus of claim 8, wherein the secondary device is a mobile device possessed at the business establishment by the second user.

12. The apparatus of claim 8, wherein the secondary device is configured to update a status change into the system.

13. The apparatus of claim 8, wherein the secondary device is configured to add a customer to a wait queue of the customer management system.

14. The apparatus of claim 8, wherein the user interface is configured to present information representing the customer to the first user when the service request is ready to be offered by the business establishment, and to accept an input representing a selection of the customer by the first user.

* * * * *